United States Patent
Kindler

(10) Patent No.: US 6,853,183 B2
(45) Date of Patent: Feb. 8, 2005

(54) NON-CONTACT POSITION SENSOR HAVING HELICOIDAL CONDUCTOR FORMING A MEASURING SURFACE COVERING A MEASURING OBJECT

(76) Inventor: Ulrich Kindler, Parchimer Strasse 15, 22143 Hamburg (DE)

(*) Notice: Subject to any disclaimer, the term of this patent is extended or adjusted under 35 U.S.C. 154(b) by 0 days.

(21) Appl. No.: 10/311,717

(22) PCT Filed: Jun. 16, 2001

(86) PCT No.: PCT/DE01/02260
§ 371 (c)(1), (2), (4) Date: Dec. 19, 2002

(87) PCT Pub. No.: WO02/01159
PCT Pub. Date: Jan. 3, 2002

(65) Prior Publication Data
US 2003/0151402 A1 Aug. 14, 2003

(30) Foreign Application Priority Data
Jun. 26, 2000 (DE) .................................... 200 11 223 U

(51) Int. Cl.$^7$ .............................................. G01B 7/14
(52) U.S. Cl. .............................. 324/207.17; 324/207.19
(58) Field of Search ...................... 324/207.15–207.19, 324/207.22–207.25; 336/75

(56) References Cited

U.S. PATENT DOCUMENTS

| | | | |
|---|---|---|---|
| 3,504,276 A | | 3/1970 | Beaver et al. |
| 3,961,243 A | * | 6/1976 | Schulz .................. 324/207.19 |
| 4,618,131 A | * | 10/1986 | Campisi et al. ................ 269/32 |
| 4,638,250 A | * | 1/1987 | Shen-Orr et al. ...... 324/207.17 |
| 4,644,570 A | * | 2/1987 | Brosh et al. ......... 324/207.16 X |
| 4,737,698 A | * | 4/1988 | McMullin et al. ......... 336/75 X |
| 5,083,084 A | | 1/1992 | Hachtel et al. |
| 5,455,508 A | * | 10/1995 | Takahashi .............. 324/207.22 |
| 5,699,025 A | | 12/1997 | Kanoh et al. |

FOREIGN PATENT DOCUMENTS

| | | |
|---|---|---|
| DE | 4 213 866 A | 10/1992 |
| DE | 4213866 A1 * | 10/1992 |
| DE | 196 426 99 A1 | 10/1996 |
| DE | 196 19 197 A1 * | 11/1997 |
| DE | 196 19 197 A | 11/1997 |
| DE | 198 32 854 A1 | 7/1998 |
| DE | 100 44 839 A1 * | 4/2001 |
| DE | 100 44 839 A | 4/2001 |
| FR | 2 682 760 * | 4/1993 |
| FR | 2 682 760 A | 4/1993 |
| FR | 2 605 400 A | 4/1998 |
| GB | 1 157 179 A | 7/1969 |
| WO | 97/39312 * | 10/1997 |
| WO | WO 9 739 312 A | 10/1997 |

OTHER PUBLICATIONS von Dipl–Ing. Otto Danz, Hamburg "Relativdehnungsaufnehmer zur Turbinenüberwachung" Oct. 1969, enclosed p. 406–408.

Dipl–Ing. Dietmar Kohn, München "Untersuchung Eines Induktiven Spiralsensors als Wegaufnehmer Und Anwendung Des Sensorelementes In Mikroelektronik–Systemen"—1986, enclosed pp. 1–171.

Dr.–Ing. Dipl–Math. Horst Rudolf Loos "Systemtechnik induktiver Weg–und Kraftaufnehmer"—1992, enclosed pp. 19–21, 38–39, 46–6 and 223–224.

* cited by examiner

*Primary Examiner*—N. Le
*Assistant Examiner*—Reena Aurora
(74) *Attorney, Agent, or Firm*—Collard & Roe, P.C.

(57) ABSTRACT

A device for contactless measurement of a displacement path, especially for the detection of position and movement, includes a sensor electronics system for the provision of an alternating current and the evaluation of alterations therein, in addition to an inductive sensor including at least one flat coil. Each coil is configured with a helicoidal conductor disposed on a plane and one of the two flat surfaces thereof forms a measuring surface which variously covers a measuring object, arranged at a distance, according to the movement thereof parallel to the measuring surface.

9 Claims, 2 Drawing Sheets

NON-CONTACT POSITION SENSOR HAVING HELICOIDAL CONDUCTOR FORMING A MEASURING SURFACE COVERING A MEASURING OBJECT

CROSS REFERENCE TO RELATED APPLICATIONS

Applicant claims priority under 35 U.S.C. §119 of German Application No. 200 11 223.6 filed Jun. 26, 2000. Applicant also claims priority under 35 U.S.C. §365 of PCT/DE01/02260 filed Jun. 16, 2001. The international application under PCT article 21(2) was not published in English

BACKGROUND OF THE INVENTION

1. Field of the Invention

The present invention relates to a device for contactless measurement of a displacement path, especially for the detection of position and movement, comprising a sensor electronics system for the provision of an alternating current and the evaluation of alterations therein, in addition to an inductive sensor comprising at least one coil.

2. The Prior Art

Similar devices, but in contrast to the displacement path measurement according to the application, are known for distance measurement, in many different forms.

SUMMARY OF THE INVENTION

For example, from DE 196 42 699 A1, which relates to a method and a device for contactless distance measurement, in which a cylinder coil is arranged in a measuring head and the face of the measuring head is located at a slight distance from the object to be measured, e.g. a turbine shaft, for the measurement.

In such eddy current sensors, attenuation of the magnetic field exiting from the sensor takes place as a function of the distance from the object to be measured, hereinafter also referred to as measuring object or measuring body with attenuation trail, measuring collar, target, or the like. In other words, the attenuation is proportional to the distance of the measuring object from the coil, so that a movement in the direction of the coil axis or longitudinal axis can be detected. For example, in order to detect the radial vibrations of a turbine shaft, an inductive sensor with a correspondingly aligned longitudinal axis can be assigned radially to the shaft. On the basis of physical dependencies, significant size requirements result for the measuring object itself, in connection with predetermined coil diameters and reasonable measurement ranges; in the state of the art, this is the distance between the coil face and the measuring object. It is true that an axial change in the turbine shaft can also be detected with this, in that a corresponding sensor is assigned to the shaft face with its longitudinal axis in the axial direction. However, here again the above dependence applies, so that significant dimensions of the objects become necessary for a required measurement range; in the state of the art, this is the distance. Nevertheless, eddy current sensors are advantageous because of their robustness and their high possible operating temperatures, and their high limit frequencies, and are well suited for use.

In the state of the art, it is also generally known to detect an axial expanse in that the known distance sensors are arranged at a previously known angle to the measuring object. However, the aforementioned problems exist here, as well.

This means that contactless displacement path sensors according to the eddy current principle are well suited for distance measurements, while position measurements using these sensors, for example, require perhaps a slanted plane on the measuring object, in order to be able to detect a displacement path portion with the distance signal, at the same time.

In the dissertation "Untersuchung eines induktiven Spiralsensors als Wegaufnehmer und Anwendung des Sensorelements in Mikroelektronik-Systemen" [Study of an inductive spiral sensor as a displacement path transducer and use of the sensor element in microelectronics systems], Fortschritt-Berichte [progress reports] VDI [Federation of German Engineers] Series 8, No. 120, VDI-Verlag, Düsseldorf, 1986, by Dieter Kohn, flat coils that were produced using circuit board technology are investigated. The goal was to combine a simple sensor, close to the principle, with microcomputer electronics, whereby the linearization, temperature compensation, and calibration are to be performed in the microcomputer. The flat coils are also used for distance measurement. However, here too, an attempt is being made to direct the entire field of the coil towards the measuring object in the measurement direction. The eddy current formation in the measuring object that is brought about by the coil field results in an increase in the loss resistance of the measuring coil, by way of the feedback to the measuring coil. This change in the loss resistance is generally assessed as an attenuation change in an oscillation circuit, in the known method. The change in inductivity that also occurs is left out of consideration in this connection; in the case of non-magnetic measuring objects a reduction in inductivity occurs, while in the case of magnetic measuring objects, an increase in inductivity occurs. Here, therefore, only a distance measurement actually takes place. Furthermore, flat coils are hardly used for eddy current sensors in the state of the art, since bundling of the magnetic field is very much poorer than in conventionally wound wire coils, because of the conductor interstices.

This, however, is extremely important in the case of the usual distance measurement using eddy current sensors. This is because eddy currents are produced in the measuring object proceeding from the sensor coil, by way of the spreading magnetic field, and for this reason the field should be as large as possible. The measuring object must be conductive and can also be magnetic. The field generated by the eddy currents builds up a field that is opposite to the exciter field. The effect is all the greater, in this connection, the closer the measuring object is located to the sensor coil. The theoretical equation relationship, which is difficult to determine, can be found, for example, in "Systemtechnik induktiver Weg- und Kraftaufnehmer, Aufnehmer und Anschlussgeräte" [System technology of inductive path and force transducers, transducers, and connection equipment], expert Verlag, Ehningen bei Böblingen, 1992, by Horst Rudolf Loos, page 52 ff. Accordingly, the eddy currents that are generated act counter to the exciting field, and reduce the self-inductivity of the exciter coil. In this connection, the loss resistance of the short-circuit winding depends on the conductivity of the object material and on the distance between the exciter coil and the object. If, in addition, the measuring object is magnetic, this feedback to the exciter coil is taken into consideration by means of the effective permeability.

The sensor coil is generally a component of an oscillation circuit with a rather high resonance frequency of 1 to 2 megahertz. The eddy currents of the measuring object cause an attenuation of the oscillation circuit, as a function of the distance from the measuring object, which is then assessed. All of the inductive sensors known according to the state of the art function according to the above principle, in other words that of influence on/attenuation of the magnetic field that exits from the coil, as a function of its axial distance from the measuring object.

A principle of a differential transformer for a displacement path measurement is known from a contribution by Otto Danz, "Relativdehnungsaufnehmer zur Turbinen überwachung" [Relative expansion transducer for turbine monitoring], in the journal Energie und Technik [Energy and Technology], October 1969, page 406 to 408. Accordingly, the measuring collar of the turbine shaft forms a low-ohm magnetic resistor, so that the voltage at the measuring coil depends on the position of the measuring collar. An output signal is measured at the terminals of the secondary coil only if the symmetry has been disrupted. This happens if the measuring collar moves out of the center position. When a phase-controlled rectifier is used, the direction of displacement is also recognized. This complicated principle is suitable for working temperatures up to approximately 350° C. and paths to be measured up to approximately 40 mm.

Furthermore, contactless long path transducers are known from "Robuste Wegsensoren für extreme Belastungen. SENSOR '83 Transducer-Technik: Entwicklung und Anwendung" [Robust displacement path sensors for extreme stresses. SENSOR '83 transducer technology: development and application], Basel conference, May 17–19, 1983, by D. Krause, and from "Linearer, kontaktloser Umformer für grosse Wege sowie hohe thermische und dynamische Belastung" [Linear, contactless transformer for large displacement paths as well as great thermal and dynamic stress], Messen+Prüfen/Automatik [Measurement and testing/automation], January/February 1981, page 43/45, by D. Krause. In the case of such sensors, a short-circuit ring is used as the measuring object, which is moved in contactless manner by way of a shank of the sensor. However, in the case of these displacement path transducers, it is particularly disadvantageous that a physically caused non-linearity occurs.

A device for measuring linear displacements of a pipe, using a rod-shaped sensor coaxially arranged in the pipe, is known from DE 198 32 854 A1, which makes it difficult to even provide coupling to the measuring object.

The devices and inductive sensors known in the state of the art are therefore only poorly suited to satisfactorily accomplish the task on which the present invention is based.

It is the task of the present invention to create a device for contactless displacement path measurement, particularly for determining position and movement, which is structured in extremely simple manner, with integrating technology, and determines the movement or the position of a measuring object, essentially independent of the contactless distance from it, orthogonal to the coil axis.

This task is accomplished, according to the invention, in that each coil is configured with a helicoidal conductor disposed on a plane, and one of the two flat surfaces thereof forms a measuring surface which variously covers a measuring object, arranged at a distance, according to the movement thereof parallel to the measuring surface.

Surprisingly, it has been shown that good measurement results concerning displacement path measurement are achieved if a target or a measuring body is guided over the surface of a flat coil at a constant distance, in contrast to the conventional sensors (for distance measurement), whereby only the regions covered by the target are attenuated. A linear behavior can be assured in simple manner, by way of the geometry of the measuring surface of the flat coils.

It is furthermore provided, according to the invention, that the measuring surface has a triangular or square or rectangular or circular or elliptical base surface with a helicoidal arrangement of the conductors. In this way, it is easily possible to form a measuring surface, depending on the purpose of use, that guarantees linear behavior.

According to the invention, it is furthermore provided that the sensor has a carrier and/or a ferrite plate, and that the ferrite plate carries the flat coil directly, or holds a support plate that holds the flat coil. Accordingly, the flat coil can be arranged directly on a ferrite plate, which serves to improve the coil field and the shielding of interference effects on the back. Furthermore, a support plate can be arranged between the ferrite plate and the flat coil. The support plate particularly serves for use in the high-temperature range. Furthermore, it can be provided that the ferrite plate is arranged on a carrier. The carrier generally serves for robust mounting of the ferrite plate.

It is furthermore advantageous to provide that the carrier is made of metal or ceramic or plastic or a circuit board material, that the ferrite plate is made of a ferromagnetic material or a ceramic with appropriate magnetic, electrical properties, and that the support plate is made of glass or ceramic. As already mentioned, the carrier serves for robust mounting and can be made of practically any desired material. It can therefore be integrated well into existing structures, for example. The ferrite plate is made of the above material in order to guarantee electromagnetic shielding, in particular. Therefore the carrier can also be made of metal, since otherwise the metallic carrier would have the effects of a measuring object on the flat coil. Instead of the ferrite plate, certain ceramics can also be used, which have appropriate magnetic, electrical properties. The support plate demonstrates good suitability for high temperatures, for example up to approximately 380° C., by means of the materials used.

It is furthermore advantageous to provide that the flat coil is sputtered onto or printed onto the ferrite plate or the support plate, and that the support plate rests completely on the ferrite plate in the region of the flat coil. In this way, particularly simple and accurate production methods that lie in the low-cost sector are possible, whereby multi-plane technology, in particular, can even result in simple but accurate reinforcement of the magnetic field.

According to the invention, it is furthermore provided that the sensor electronics system is an integral part of the inductive sensor. On the basis of the possible use of sputtering and printing technology, in particular, as well as of normal conductor tracks, integration of the sensor electronics system is particularly simple.

It is furthermore advantageous to provide that the control electronics are an integral part of the inductive sensor and the flat coil. This actually makes it possible to arrange the sensor electronics system directly in the region of the flat coils, thereby saving space.

Furthermore, it is advantageous to provide that the flat coil is part of an electrical oscillation circuit and has a bridge circuit integrated into the sensor electronics system, for its attenuation or evaluation, at frequencies from kilohertz to megahertz. In this way, practically all of the advantages connected with thin-layer technology can be utilized. This makes the sensor electronics system easy to produce, and they can be equipped with simple components, which are suitable for the frequencies stated, on the basis of a bridge circuit.

It is furthermore advantageous to provide that the flat coil is printed or sputtered directly onto a silicon chip, in whole or in part, which chip also carries all the other circuits. In this way, standard components with the highest quality and precision can be used directly, in accordance with the application.

Furthermore, it is advantageous to provide that the measuring object that influences the measuring surface is electrically conductive, or that the measuring object has an electrically conductive target or measuring collar, and covers a coil area of the flat coil that can be predetermined geometrically, as a function of the position of the target or measuring collar. In this way, an electrically conductive measuring object, which can, in addition, be magnetic, can influence the measuring surface directly. In the case of a longitudinal expanse of a turbine axis, actually increasingly cover. It is also possible, in the case of a measuring object that is not electrically conductive, to arrange a target on it and to allow it to act/utilize it accordingly. However, it is also possible to use a narrow target, similar to a strip, which moves over the measuring surface and covers a varying amount of the coil surface, on the basis of the geometry of the measuring surface. The different attenuation is then a measure of the movement.

According to the application, it is furthermore provided that a rectangular measuring surface, diagonally divided, has a triangular flat coil, in each instance, whereby its inductance and its ohmic resistance form half of a bridge circuit, the other half of which is complemented with ohmic resistors, to produce a full bridge. This arrangement is particularly advantageous, since it simultaneously serves for compensation of the distance influence. This is because in case of an undesired radial movement of the measuring object, an opposite change in the inductances and ohmic resistors of the two coils takes place which, complemented with resistors to form a full bridge, allow a measurement independent of distance.

According to a particular embodiment, it is furthermore provided that a second sensor, with a measuring surface diagonally divided into two flat coils, is arranged so that the measuring object lies symmetrically between the two sensors and that the two flat coils of each sensor, in each instance, form the inductances and ohmic resistors of half of the bridge circuit, in each instance. In this way, signal doubling can take place, with simultaneous compensation of the undesired radial distance influence. In connection with a phase-correct rectifier, a movement of the measuring object, with the correct sign, can be indicated, starting from the zero position.

It is furthermore advantageous to provide that a rectangular measuring surface, diagonally divided, has two triangular flat coils, whereby the inductance and the ohmic resistance of one flat coil and a complementary ohmic resistor form one half of a bridge circuit, whose other half is diagonally complemented with an inductance and ohmic resistance and another complementary ohmic resistor to form a full bridge. Particularly in the case of increasing full coverage of a correspondingly divided flat coil, this diagonal bridge has demonstrated a qualitatively high and essentially distortion-free evaluation, which takes the increasing coverage for both flat coils appropriately into consideration.

According to the application, it is furthermore provided that the target or the measuring collar is adapted to the measuring object and/or rectangular and/or bow-shaped and/or ring-shaped. Particularly in the case of measurements of piston positions of compressed air or pneumatic cylinders, as well as a cone of flow-through measuring devices, simple adaptation to the measurement purpose can take place in this way.

Furthermore, it is provided, according to the invention, that the measuring surface of the sensor for a movement measurement of balls or rollers in bearings is arranged in their central vicinity and has a smaller cross-sectional surface than the measuring object. In this way, the device is actually suited to reliably guarantee the movements of microparts, without any other technical effort.

Furthermore, it is advantageous to provide that the measuring surface of the sensor is shaped like an arc, in order to determine movement on an arc. In this way, even angle measurements are possible, i.e. a displacement path measurement along an arc.

Furthermore, it is advantageous to provide that the measuring surface of a sensor has a great change in surface in a region with the desired greatest resolution. In this way, it is possible to achieve characteristic signal images when moving past certain shaped parts, for example, such as coins, so that the device according to the invention is also suitable for sorting coins, for example.

Furthermore, it is provided, according to the invention, that a rectifier is an integral part of the sensor electronics system. As already mentioned, it is easily possible, in connection with a phase-correct rectifier, to indicate a movement of the measuring object from the zero position, with the correct sign.

It is advantageous to provide that Schmitt trigger electronics are an integral part of the sensor electronics system, and that the sensor electronics system emits a threshold signal. In this way, threshold value switches can be built.

It is furthermore advantageous to provide that the device is completely arranged within a housing. In this way, it is compact and protected from environmental influences, and can be reliably used even under robust ambient conditions.

In summary, the invention is therefore based on a measuring coil as a flat coil, which is constantly crossed in contactless manner, at a constant, slight distance from a measuring object. For example, for the purpose of linear behavior, the measuring surface can be configured to be triangular. With a measuring collar on a turbine shaft, the radial expanse of the turbine shaft can therefore be determined with this. In this connection, advantage is taken of the fact that the magnetic field formed around itself by each conductor is influenced by the local coverage of the measuring object only in accordance with the coverage area, by way of the eddy current effect. When the measuring object is moved from one position to another, an increasing or decreasing coverage of conductor parts of the measuring coil takes place, as a function of the measuring path. In this connection, the measuring object can cross the measuring coil as a strip or, alternatively, can cover it increasingly completely, for example as a rectangular measuring object. The transformation of the measuring path into an electrical measuring signal can take place, in the case of the known methods, by way of an oscillation circuit, the inductance of which consists of the measuring coil, and which is supplied by an oscillator. It has proven to be particularly advantageous for the invention to use an alternating current bridge circuit. The triangular flat coil, for example, represents an inductance and an ohmic resistance, and an opposite further triangular flat coil, which complements the first to form a rectangle, represents another inductance and another ohmic resistance. If the measuring object is moved from one position to another, an opposite change in the inductances and impedances of the flat coils takes place. These inductances and ohmic resistors form one half of a bridge circuit, and can be complemented with ohmic resistors on the other half, to form a full bridge. In this way, a measuring voltage that is proportional to the displacement of the measuring object can be tapped between the measuring points of a bridge circuit. In connection with a phase-correct rectifier, a movement of the measuring object out of the zero position, with the correct sign, can therefore be indicated. The advantages of the bridge circuit lie, in particular, in the reduction in the temperature dependence of the measuring effects and in the dependence on distance. For this purpose, an additional symmetrical measuring arrangement can be provided in order to double the measuring signal. A diagonal bridge circuit has the advantages described above.

Other preferred embodiments of the invention are evident from the dependent claims.

BRIEF DESCRIPTION OF THE DRAWINGS

An exemplary embodiment of the invention will be explained in greater detail below, on the basis of a drawing. This shows.

DETAILED DESCRIPTION OF PREFERRED EMBODIMENTS

Figure 1:
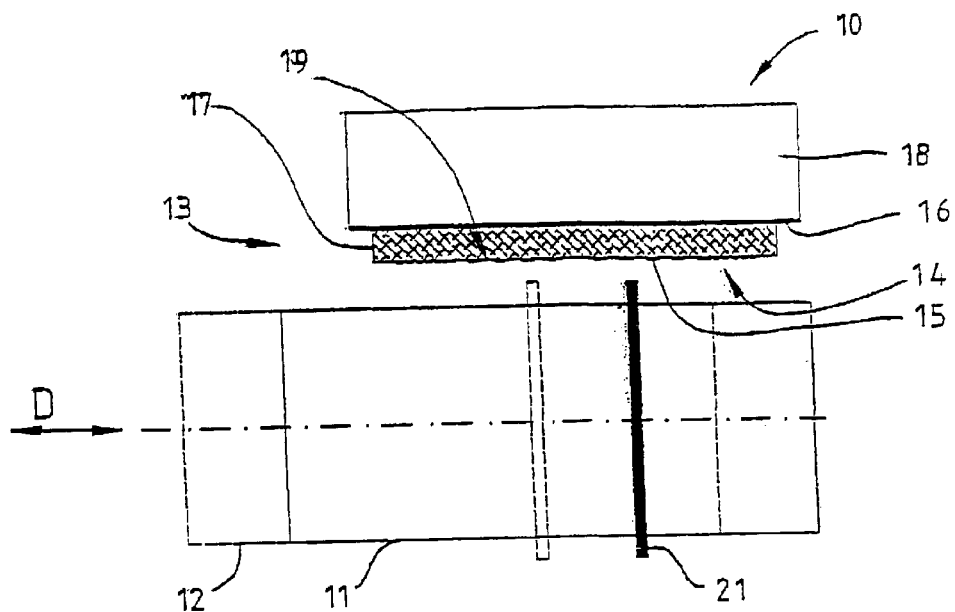
FIG. 1 schematically, a device according to the invention, with regard to a measuring object, with one sensor, FIG. 2 schematically, a device according to the invention in accordance with FIG. 1, with two sensors, FIG. 3 schematically, the measuring surface of a sensor of a device according to the invention, and FIG. 4 an equivalent circuit schematic of a bridge circuit for determining the measuring result in the case of multi-coil sensors.

FIG. 1 shows a device 10 according to the invention, for contactless displacement path measurement, for example of a shaft 11, which can be a turbine shaft and moves in its longitudinal expanse, from left to right in FIG. 1, as indicated with broken lines 12 and arrow D. The device 10 has an inductive sensor 13 that is arranged at a distance from the shaft 11. The sensor 13 has a flat measuring surface 14, which is formed by a flat coil 15.

The flat coil 15 can be arranged directly on a ferrite plate 16, or first on a support plate 17, which in turn is arranged on the ferrite plate 16. The ferrite plate 16 itself is, in turn, arranged on a carrier 18, which gives it support and can be made of practically any desired material, for example metal, plastic, circuit board material or also a ceramic. The ferrite plate 16 is made of ferromagnetic material, or also a ceramic with appropriate electrical, magnetic properties. It serves to shield electromagnetic effects on the part of the carrier 18, which can therefore also be made of metal. In other words, the second surface 19 of the flat coil 15, which faces away from the measuring surface 14, is rigidly arranged on a substratum and free of any electromagnetic influences. The support plate 17 generally serves as a thermally robust support of the flat coil 15. By using glass or ceramic for the support plate 17, temperatures of up to 380° C. can be safely achieved.

A particularly simple device 10 can actually consist only of the ferrite plate 16 and the flat coil 15, arranged directly on it, if the materials are selected in a special way. The support plate 17 and the carrier 18 are eliminated.

Figure 4:
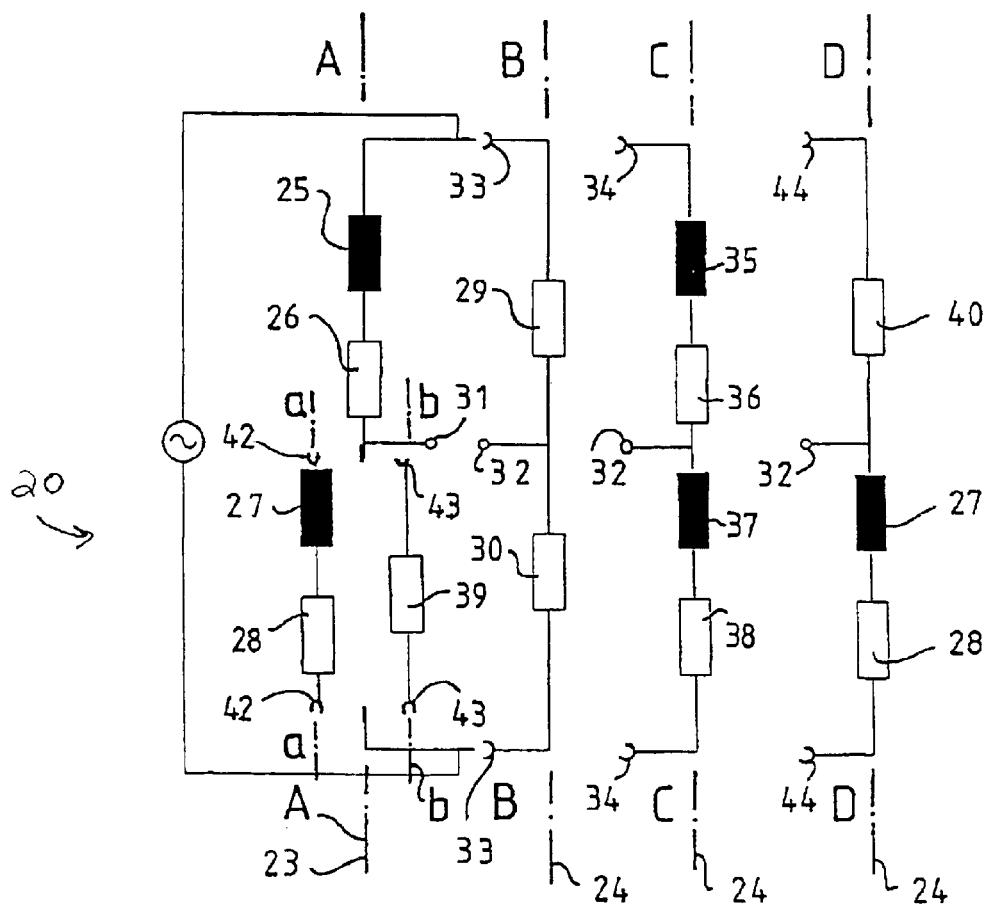

The device 10 furthermore comprises a sensor electronics system which, however, is not shown in detail, with oscillation circuits, etc., a bridge circuit 20 shown schematically in FIG. 4, and a rectifier circuit, with the necessary elements and connections.

Figure 3:
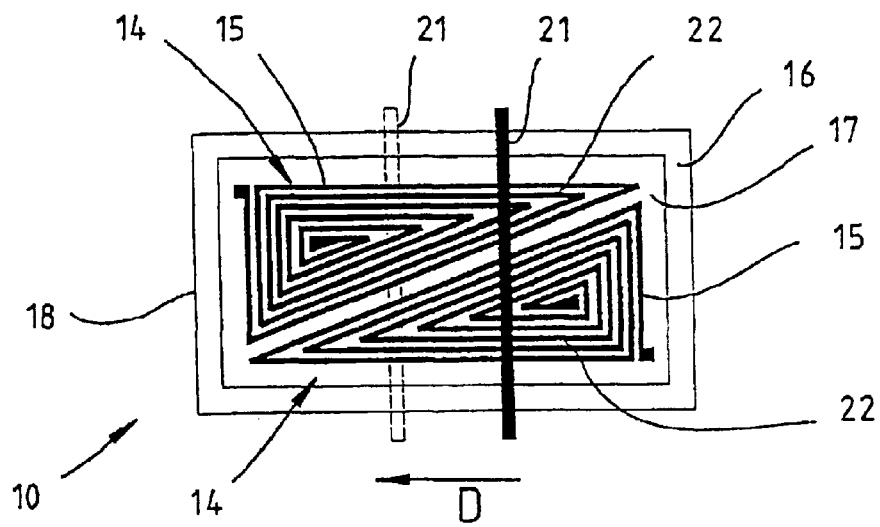

The shaft 11 moves in the direction of the arrow D. It carries a measuring collar/target 21, which must be electrically conductive and can also be magnetic. In the case of movement in the direction of arrow D, the shaft 11, and therefore also the target 21 moves parallel and orthogonal to the measuring surface 14. As shown in FIG. 3, the measuring surface 14 of the flat coil 15 has at least one conductor 22 per flat coil 15, which is arranged in helicoidal form in the plane of the measuring surface 14. Advantageously, the conductor 22 can be arranged helicoidally so that the base surface of the measuring surface 14 is triangular. Even without studying FIG. 3, it can be imagined that in the case of a triangular measuring surface 14, if the target 21 moves, more or fewer conductors 22 are covered by the target 21. Therefore, more or fewer eddy currents are produced in the target 21 which, in the final analysis, have an attenuation effect on the inductive sensor 13 and allow the evaluation of a position signal. In the case of a specific material selection, the shaft 11 itself can also allow a corresponding signal by means of a greater or lesser coverage of the measuring surface 14.

In the case of other movements to be detected, the conductor 22 can have a geometrically different shape; for example, a square or rectangular or circular or elliptical measuring surface 14 can be formed. However, it has proven to be advantageous that in the case of the radial expanse measurement of a shaft 11, as shown, radial movements resulting from vibrations, etc., of the shaft 11 itself result in measuring variations, since the electromagnetic field to the flat coil 15 is greatly dependent on distance. This influence can be eliminated, according to the application, in extremely simple manner, in that another triangular measuring surface 14 is arranged in such a way, together with a first flat coil 15, that a diagonally divided rectangular or square total/measuring surface 14 is formed. If evaluated appropriately, the changes in the opposite coil signals can result in an elimination of the distance effect.

Figure 2:
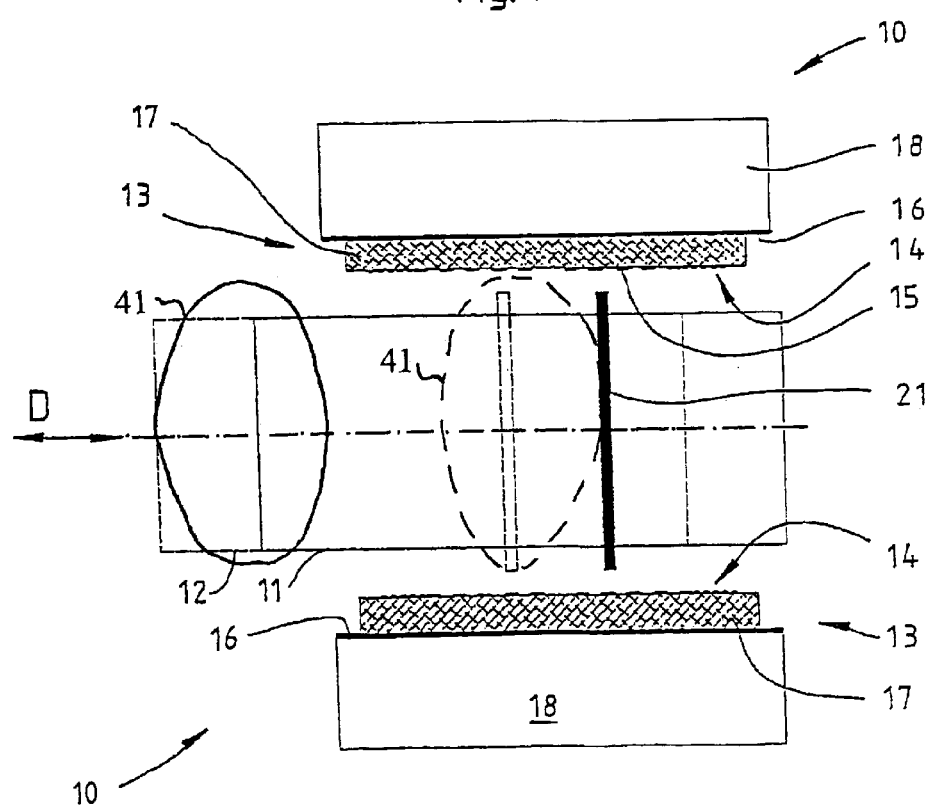

FIG. 2 shows two devices 10, the measuring surfaces 14 of which are arranged parallel and at a distance from one another and opposite one another. The distance between the measuring surfaces 14 is dimensioned in such a way that the shaft 11 can be arranged symmetrically between the two devices 10. While keeping the configuration of the individual devices 10 and also of the shaft 11 with the target 21 otherwise the same, signal doubling can be achieved in this way, in extremely simple manner. Of course it is also possible to arrange other devices 10 accordingly, in the circumference region of the shaft 11, and to pass the data individually obtained from the devices 10 on to assessment externally. In this way, not only can a reinforcement of the output signal be achieved, but also the measuring accuracy can be increased, as well as the detection of complex surface displacements on an object, which occur, for example, in the case of tensile tests of any desired objects. As shown in FIG. 2, the measuring surface 14 of the sensor 15 for a movement measurement of balls or rollers 41 is arranged in their central vicinity and has a smaller cross-sectional surface than the measuring object 11.

FIG. 3 shows the device 10 in a top view onto the measuring surface 14. Two flat coils 15 with one conductor 22 each, with a triangular base surface, in each instance, can easily be seen, whereby the flat coils 15 complement one another to form a rectangular total/measuring surface 14. Here again, the target 21 is indicated, which is moved in the direction of arrow D up to the position 21 shown with a broken line, and in this connection covers, i.e. physically covers differently many coil segments, in the final analysis, surfaces of the flat coil 15. In accordance with the geometry, this takes place in opposite directions, i.e. it takes place increasingly for the one coil, and decreasingly to the same extent for the other coil 15. In this connection, the flat measuring surface 14 is arranged centrally on the support plate 17, which in turn is attached to the larger ferrite plate 16. The ferrite plate 16 always has a greater expanse than the measuring surface 14 and therefore also than the support plate 17, in order to assure complete shielding of the measuring surface 14, in other words of the inductive sensor 13, on the side of the surface 19 towards the carrier 18.

Although it is not shown, the control electronics system with all of its elements, including the oscillation circuit, the bridge circuit 20, if necessary a Schmitt trigger, etc., can be structured with the same technology as the flat coil 15 itself, and can be arranged directly on the measuring surface 14. Sputtering technology has proven to be particularly advantageous for this, or also the technology of printed circuits, also directly onto a silicon chip, which then can also contain the electrical circuits. Both are techniques that can be carried out with a single layer or multiple layers, and are available at a low price, at high quality.

FIG. 4 shows a bridge circuit 20. The bridge circuit 20 consists of a first half 23 according to line A—A, with alternatives in the bottom bridge branch according to line a—a and b—b, and a second half 24 according to line B—B or C—C or D—D. This is preferably a Wheatstone bridge circuit for alternating current. In the case of only one device, according to FIG. 1, with a total/measuring surface 14 with two flat coils 15 according to FIG. 3 and a narrow target 21, a bridge circuit 20 in which the inductance 25 And the ohmic resistor 26 of the first flat coil 15 and the inductance 27 and the ohmic resistor 28 of the second flat coil 15 are in contact in the first half 23 according to the line A—A and a—a has proven to be advantageous. The plugs 42 that are indicated are brought into contact. By moving the target 21 according to FIG. 3, an opposite change in the corresponding inductances 25 and 27 and the ohmic resistors 26 and 28, on the other hand, takes place. In this case, the resistors 29 and 30 form the bridge complement to form the full bridge in the second half 24 according to the line B—B of the bridge circuit 20. Between the measuring points 31, 32, the measuring voltage, which is proportional to the displacement of the measuring object, can be tapped. In this case, the plugs 33 that are indicated are brought into contact.

In the case of two sensors 13 according to FIG. 2, with two flat coils 15 each per total/measuring surface 14, it is possible, according to an advantageous and extremely simple bridge circuit 20, to contact the second half 24 according to C—C, instead of the second half 24 according to B—B, by way of the plugs 34, which complements the first half 23 of the bridge circuit 20 according to line A—A and a—a, to form a full bridge, while leaving the circuitry of the first half 23 the same. The inductances 35 and the ohmic resistor 36 represent the characteristic values of the first flat coil 15 of the second sensor 13, and the inductance 37 and the ohmic resistor 38 represent the characteristic values of the second flat coil 15 of the second sensor 13. Here again, a measuring voltage that is proportional to the displacement of the measuring object can be tapped between the measuring points 31 and 32. In connection with a phase-correct rectifier, not shown, a movement of the measuring object 11 from the zero position, with the correct sign, can be indicated.

In the case of a sensor 13 according to FIG. 2, with two flat coils 15 according to FIG. 3, and a target 21 that increasingly or decreasingly covers the total/measuring surface 14, a bridge diagonal circuit 20 has proven to be extremely advantageous, in which the inductance 25 and the ohmic resistor 26 of the first flat coil 15 of the first half 23 are arranged in the top bridge branch, according to the line A—A, while the inductance 27 and the ohmic resistor 28 of the second coil 15 of the second half 24 are arranged in the bottom bridge branch, according to the line D—D, whereby the second half 24 comes into contact by way of the plugs 44. The ohmic resistors 39 and 40 that complement the bridge circuit are connected, i.e. arrangpd according to the line A—A and b—b in the first half 23, by way of the plugs 43, and in the top bridge branch in the second half 24. With this diagonal bridge circuit 20, a measuring voltage that is proportional to the displacement of the measuring object can be tapped between the measuring points 31 and 32.

The advantages of the proposed bridge circuit 20 lie, in particular, in the reduction of the temperature dependence of the measuring effects and of the distance dependence.

The characteristics of the invention as disclosed in the above specification, in FIGS. 1 to 4, as well as in the claims, can be essential for implementing the invention in its various embodiments, both individually and in any desired combination.

What is claimed is:

1. A device for contactless measurement of a displacement path comprising:
   (a) a sensor electronics system;
   (b) an inductive sensor comprising at least one coil wherein each coil is configured with a helicoidal conductor disposed on a plane and having two flat surfaces, one of said two flat surfaces forming a measuring surface which variously covers a measuring object, arranged at a distance, according to movement thereof parallel to said measuring surface;
   wherein said sensor electronics system provides an alternating current to said inductive sensor and evaluates changes in the alternating current caused by the measuring object;
   wherein the measuring object is guided at a constant distance over the surface of the flat coil;
   wherein the sensor electronics system is formed for detecting changes in attenuation due to the varying area of the flat coil covered by the measuring object;
   wherein the measuring object that influences the measuring surface is electrically conductive, or the measuring object has an electrically conductive target or measuring collar, and covers a coil area of the flat coil that can be predetermined geometrically as a function of the position of the target or measuring collar; and
   wherein a rectangular measuring surface is diagonally divided into two triangular flat coils, whereby their inductances and ohmic resistors form half of a bridge circuit, the other half of which is complemented with resistors, to produce a full bridge.

2. Device according to claim 1, wherein the sensor has a carrier and/or a ferrite plate, and the ferrite plate carries the flat coil directly, or holds a support plate that holds the flat coil.

3. Device according to claim 2, wherein the carrier is made of metal or ceramic or plastic or a circuit board material, the ferrite plate is made of a ferromagnetic material or a ceramic with appropriate magnetic, electrical properties, and the support plate is made of glass or ceramic.

4. Device according to claim 3, wherein the flat coil is sputtered onto or printed onto the ferrite plate or the support plate, and the support plate rests completely on the ferrite plate in the region of the flat coil.

5. Device according to claim 1, wherein a second sensor, with a measuring surface diagonally divided into two flat coils, is arranged so that the measuring object lies symmetrically between the two sensors and the two flat coils of each sensor, in each instance, form the inductances and ohmic resistors of half of the bridge circuit, in each instance.

6. Device according to claim 1, wherein the target or the measuring collar has a shape adapted to the measuring object or is rectangular, bow-shaped, or ring-shaped.

7. Device according to claim 1, wherein the measuring surface of the sensor for a movement measurement of balls or rollers in bearings is arranged parallel to a direction of displacement (D) of the measuring object and has a smaller cross-sectional surface than the measuring object.

8. Device according to claim 7, wherein the measuring surface of the sensor has a maximum cross-sectional area at a longitudinal position along the direction D where a maximum of resolution in position measurement is required.

9. A device for contactless measurement of a displacement path comprising:
   (a) a sensor electronics system;
   (b) an inductive sensor comprising at least one coil wherein each coil is configured with a helicoidal conductor disposed on a plane and having two flat surfaces, one of said two flat surfaces forming a measuring surface which variously covers a measuring object, arranged at a distance, according to movement thereof parallel to said measuring surface;
   wherein said sensor electronics system provides an alternating current to said inductive sensor and evaluates changes in the alternating current caused by the measuring object;
   wherein the measuring object is guided at a constant distance over the surface of the flat coil;
   wherein the sensor electronics system is formed for detecting changes in attenuation due to the varying area of the flat coil covered by the measuring object; and
   wherein a rectangular measuring surface is diagonally divided into two triangular flat coils, whereby their inductance and the ohmic resistor form half of a bridge circuit, the other half is diagonally complemented with inductance and ohmic resistor and another complementary resistor to form a full bridge.

* * * * *